US011677789B2

(12) United States Patent
Rungta et al.

(10) Patent No.: US 11,677,789 B2
(45) Date of Patent: Jun. 13, 2023

(54) INTENT-BASED GOVERNANCE

(71) Applicant: Amazon Technologies, Inc., Seattle, WA (US)

(72) Inventors: Neha Rungta, San Jose, CA (US); Daniel George Peebles, Richland, WA (US); Andrew Jude Gacek, Maple Grove, MN (US); Marvin Theimer, Seattle, WA (US); Rebecca Claire Weiss, Vienna, VA (US); Brigid Ann Johnson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 17/119,663

(22) Filed: Dec. 11, 2020

(65) Prior Publication Data
US 2022/0191253 A1 Jun. 16, 2022

(51) Int. Cl.
*G06F 15/16* (2006.01)
*H04L 9/40* (2022.01)
*H04L 41/5051* (2022.01)
*H04L 41/50* (2022.01)

(52) U.S. Cl.
CPC ........ *H04L 63/205* (2013.01); *H04L 41/5051* (2013.01); *H04L 41/5096* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 7,962,633 B1* | 6/2011 | Sidebottom | ......... | H04L 41/0893 709/229 |
| 10,652,266 B1* | 5/2020 | Tautschnig | .......... | H04L 63/1433 |
| 11,171,939 B1* | 11/2021 | Blank | ..................... | H04L 63/18 |
| 11,223,538 B1* | 1/2022 | Arumugam | ......... | H04L 41/0803 |
| 11,283,691 B1* | 3/2022 | A | ......................... | H04L 41/5051 |
| 2004/0221022 A1* | 11/2004 | Gracyk | .................... | H04L 41/12 709/223 |
| 2012/0254851 A1* | 10/2012 | Diab | ........................ | H04L 41/12 717/176 |
| 2014/0115578 A1* | 4/2014 | Cooper | .................. | H04L 63/205 718/1 |
| 2016/0070908 A1* | 3/2016 | Sanghvi | ................. | G06F 21/554 726/23 |
| 2019/0394089 A1* | 12/2019 | Barrett | ................. | H04W 12/088 |
| 2021/0126948 A1* | 4/2021 | Nedbal | ................... | H04L 63/20 |
| 2021/0286638 A1* | 9/2021 | Fan | .......................... | H04L 67/10 |
| 2021/0406152 A1* | 12/2021 | Quemy | ............... | G06F 11/3624 |

* cited by examiner

*Primary Examiner* — Brian Whipple
*Assistant Examiner* — Gregory P Tolchinsky
(74) *Attorney, Agent, or Firm* — Nicholson De Vos Webster & Elliott LLP (57) ABSTRACT

Techniques for intent-based access control are described. A method of intent-based access control may include receiving, via a user interface of an intent-based governance service, one or more intent statements associated with user resources in a provider network, the one or more intent statements expressing at least one type of action allowed to be performed on the user resources, compiling the one or more intent statements into at least one access control policy, and associating the at least one access control policy with the user resources.

20 Claims, 8 Drawing Sheets

INTENT-BASED GOVERNANCE

BACKGROUND

Permission management in provider networks is often very complicated. Such complicated permission management can make users wary of utilizing new services, or the provider network at all, for fear of inadequate security of their resources. Customers can specify their data perimeter using access control primitives. For example, they author policies across various principals and resources to secure sensitive data and workloads. However, these policies do not change as the underlying systems to which the policies apply change. As such, customers have to constantly update these policies, or create new policies, based on changes to the provider network or to their own organization because they do not have an explicit ability to specify intent about their data perimeter. To make updates, customers have to be aware of all the relevant changes and understand the service-specific idiosyncrasies in the provider network, leading to a lot of undifferentiated heavy lifting and a lack of visibility into what gaps exists in their data perimeter.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for intent-based access control. According to some embodiments, an intent-based governance service includes a domain specific language which includes a plurality of supported intents. A user can write intent statements using the domain specific language (e.g., "my resources should be tagged by their cost-center", "my resources cannot be shared across accounts", "only the security admin can alter configurations of the security services", etc.). The intent-based governance service can then compile these statements to automatically generate policies and attach them to the corresponding principals and resources to enforce the data perimeter. This leads to significant time savings for customers who do need to spend authoring low level policies, debugging, and testing them to ensure they satisfy their higher-level intent. Embodiments also automatically update the policies based on the intent statements when the provider network launches new services and features and/or when there are changes within a customer's own organization. This ensures that customers have a secure and updated data perimeter at all times.

Traditionally, a user may define a policy which specifies permissions for their resources. However, such a policy is only applicable for the provider network and its services at the point in time at which the policy is written. For example, a policy can be written that restricts access to data in a storage service from being accessed by anyone outside of the user's organization. This can be implemented to restrict access to the existing endpoints from which the data in the storage service can be accessed and to restrict the ability of individual users within the organization from sharing the data with other accounts. However, if the storage service is updated to include new sharing features (e.g., enabling individual users to create new endpoints, providing interfaces to other services that did not previously have access, etc.) then the existing policies may not cover these new features. This adds security risks that may not be apparent unless the customer is routinely monitoring changes to the provider network and its services.

In some embodiments, the user can access the intent-based governance service via a user interface, such as a console, to provide the intent-based statements. The intent-based governance service can compile the statements and provide feedback as to what the resulting policies of the intent-based statements would be and any conflicts those new policies would potentially result in in the user's organization. If any resulting permissions cannot be mapped in accordance with the user's stated intent, then an error message can be returned indicating how the new policies cannot be implemented. As a result, the user does not have to deal with the underlying complexities of permission management for every service provided by the provider network. Additionally, the user does not have to stay up to date on changes to the provider network or the services it provides. Instead, the intent-based governance service can monitor the provider network and its services for changes and automatically update policies to remain consistent with the user's stated intent.

Figure 1:
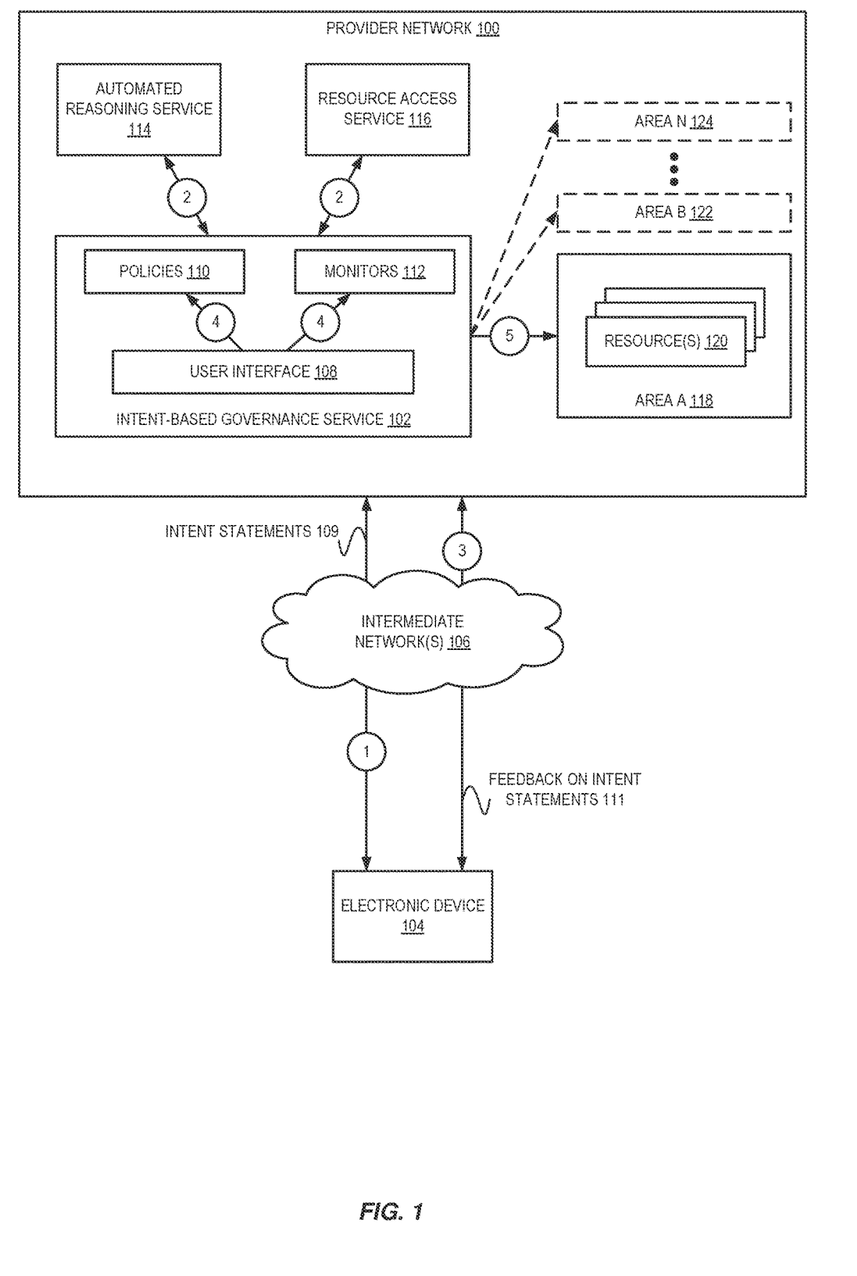
FIG. 1 is a diagram illustrating an environment for intent-based governance according to some embodiments.

FIG. 1 is a diagram illustrating an environment for intent-based access control according to some embodiments. Customers (e.g., users) of a provider network 100 can host various resources in the provider network 100. An intent-based governance service 102 enables users to intuitively define high level security intentions for managing access to those resources. For example, embodiments enable users to specify intent using easy to understand simple declarative statements. This intent is then translated into policies that are applied to the user's resources across various services offered by the provider network. For example, such policies can include identity and access policies, resource policies, and service control policies, as well as networking controls, data lake authorization mechanisms, etc. The intent-based governance service 102 can automatically generate permissions based on the intent and keep the permissions up to date as changes to the provider network 100 or the user's resources occur. Additionally, users can update their intent and existing permissions are updated accordingly.

A provider network 100 (or, "cloud" provider network) provides users with the ability to utilize one or more of a variety of types of computing-related resources such as compute resources (e.g., executing virtual machine (VM)

instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In various embodiments, a "serverless" function may include code provided by a user or other entity—such as the provider network itself—that can be executed on demand Serverless functions may be maintained within provider network 100 by an on-demand code execution service (referred to in various embodiments as a function compute service, functions service, cloud functions service, functions as a service, or serverless computing service) and may be associated with a particular user or account or be generally accessible to multiple users/accounts. The on-demand code execution service can enable customers of the provider network 100 to execute their code on cloud resources without having to select or manage the underlying hardware resources used to execute the code. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. For example, a customer may be able to use the on-demand code execution service 116 by uploading their code and using one or more APIs to request that the service identify, provision, and manage any resources required to run the code. As such, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, a user via electronic device 104 can access intent-based governance service 102 at numeral 1. This can include accessing the intent-based governance service 102 via one or more application programming interfaces (APIs), a console, or other user interface. For example, the user can provide one or more intent statements 109 in a domain specific language to the intent-based governance service 102 at numeral 1. Each intent statement expresses a governance strategy related to at least one intent (also referred to as a "fact") The domain specific language may define a plurality of intents based on a model of provider network 100 and its various services. Each intent may correspond to a type or class of actions that can be performed on user resources by one or more services of provider network 100. For example, a "sharing" intent may encompass various actions that can be performed by services that grant access to user data or resources (e.g., allow exporting of customer data to other accounts, provide access to customer data via public endpoints, etc.). As such, an intent statement related to a sharing intent may define to whom or under what conditions a resource may be shared. For example, an intent statement may include "<resource X> is not shareable", or "<resource X> is shareable with <Y account(s)>". In various embodiments, intents may be defined in the domain specific language related to various domains, such as exfiltration protection, region management, software development kit (SDK) management, tag standards and practices, access control, etc.

The intent-based governance service 102 convert intent statements into policies and provide feedback to the user on how those policies may impact the user's resources. For example, existing policies may be in conflict with one or more of the intent statements. For example, if the intent statement is that no resources should be shared outside of the user's organization, the intent-based governance service 102 can generate a policy and check that policy against existing access patterns of the organizations resources. For example, at numeral 2, the intent-based governance service 102 can send a request to an automated reasoning service 114 and/or a resource access service 116 to determine if there are any conflicts with the new policy and existing permissions. The automated reasoning service 114 can translate policies into mathematical representations and then use automated reasoning tools (such as Satisfiability Modulo Theories (SMT) solvers) to analyze the representations of the policies to determine whether conflicts occur. Similarly, resource access service 116 can keep track of how resources have been previously accessed. For example, resource access service 116 can keep track of last access information for customer resources and/or what resources are accessible regardless of when they were last accessed. This way, intent-based governance service 102 the domain of the intent into account (e.g., for sharing intents the current sharing activity can be examined, for tagging the current tag rules can be examined, etc.).

Based on the response(s) from the automated reasoning service 114 and/or resource access service 116, the intent-based governance service 102 can return feedback 111 to the user at numeral 3. For example, if a new policy restricts access to resources 120 to area A 118, but resource access service 116 indicates that the resources are regularly accessed from one or more of area B 122 to area N 124, then an alert can be returned to the user indicating the new policy is inconsistent with existing access patterns. For example, if the intent is related to sharing data, then the intent-based governance service 102 can determine who has shared data in the user's organization, who is currently allowed to share data, as well as the current state of data sharing (e.g., what is currently shared). If any of this data conflicts with the intent (e.g., if the intent is to disallow sharing, but some data is currently being shared), then this conflict can be identified to the user. The user can then confirm the new policies to be created based on the intent statements previously provided at numeral 1 or update the intent statements to allow some or all of the conflicts. For example, the intent statement can be updated to restrict access from other areas other than the existing access patterns. Additionally, or alternatively, the new policies can be returned to the user at numeral 3 indicating how the intent statements map to the new policies. For example, changes to existing policies may be highlighted or new policies created for additional services where previous policies did not exist can be highlighted.

At numeral 4, once any discrepancies or conflicts have been addressed new policies 110 and/or monitors 112 can be generated by the intent-based governance service 102. In some embodiments, monitors 112 can watch for events that violate the user's intent statements and then present the events to the user, automatically respond to the events, etc. Additionally, the new policies can be automatically attached to the user's resources 120 at numeral 5. This may include resources across multiple areas, resources in a particular area, etc. In various embodiments, the areas of provider network 100 can include a region, an AZ, or other portion of the provider network which may correspond to a geographic area or other logical subdivision of the provider network. In some embodiments, specifically ordered steps described herein may alternatively be performed in any order.

Figure 2:
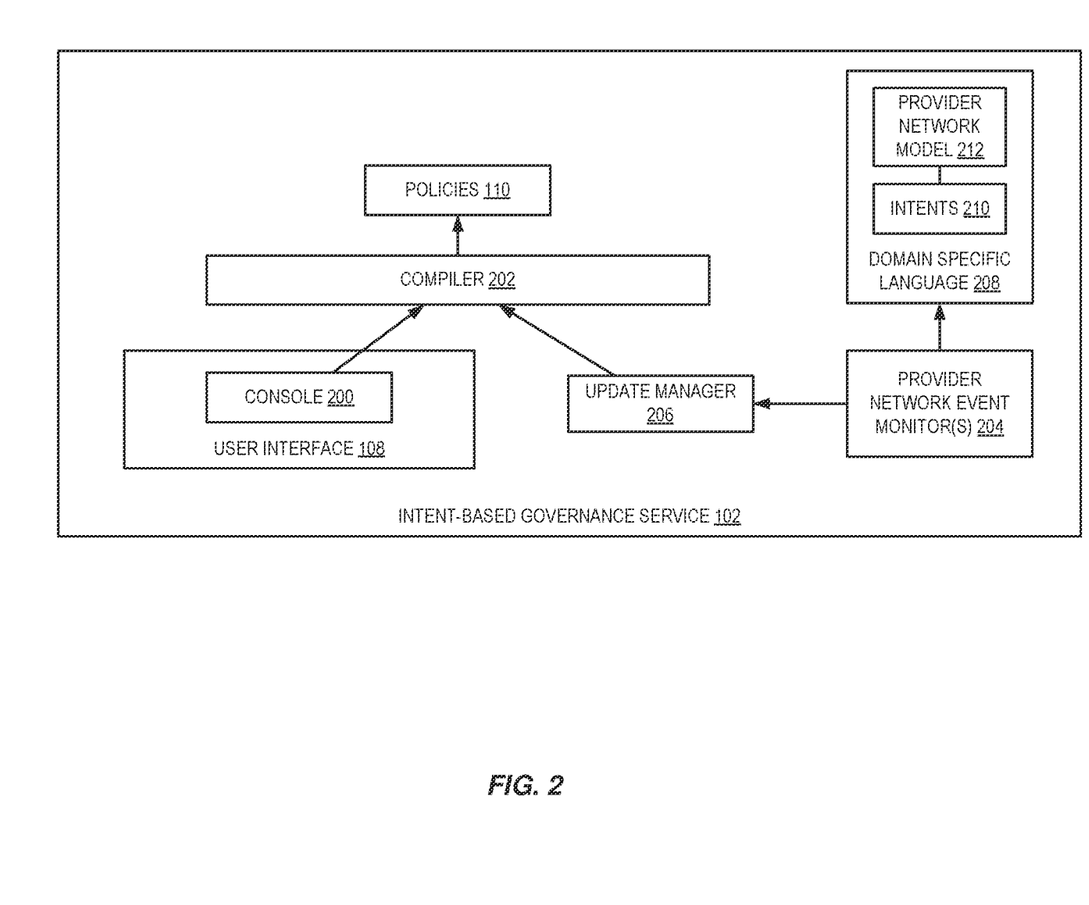
FIG. 2 is a diagram illustrating an intent-based governance service according to some embodiments.

FIG. 2 is a diagram illustrating an intent-based governance service according to some embodiments. As discussed, intent-based governance service 102 can include a user interface 108 through which intent statements can be received. As shown in FIG. 2, in some embodiments, the user interface 108 includes a console 200 which can receive the intent statements and return feedback to the user based on the resulting policies 110 that are generated from the intent statements. For example, when a user provides an intent statement in a domain specific language, the intent statement is provided to a compiler 202 which compiles the intent statement into at least one policy 110. In some embodiments, the compiler 202 compiles the intent statements received through console 200 into a single policy. Alternatively, the intent statements may be compiled into multiple policies. The resulting policy or policies can be in the same format as traditionally generated policies (e.g., JSON or similar format).

These auto-compiled polices 110 allow customers to have syntactically correct constructions such that the policy variables are well-formed (e.g., have a closing tag), the * character does not appear in service or federated principals, the * character should not appear in any string compared with StringEquals or StringNotEquals, correct operators apply to appropriate operators, etc. They also allow them to do share their data with intended accounts, services, and without inadvertently making the policy public. In some embodiments, the compiler 200 generates appropriately formatted policies and also determines the "attachment point" for the policy. For example, policies about principals in an organization only work if they are attached to the proper organization. The compiler 200 is also responsible for identifying the appropriate type of policy to be generated to achieve the intended results.

As discussed, the intent-based governance service 102 ensures that policies are in place based on the intent statements even as changes are made to the provider network 100. Accordingly, the intent-based governance service 102 may include one or more provider network event monitors 204. The provider network event monitors 204 can track the status of service updates, code updates, and other changes made to the provider network 100 over time. These may result in an updated provider network model 212 which includes a description of the provider network including the areas of the provider network, the services offered by the provider network, and actions that the services can perform. The model 212 is updated as new intents 210 are supported and/or as changes are made to the provider network or its services. For example, if a new area is added to the provider network then the model 212 is updated to reflect that (e.g., the vocabulary of the model is updated with the name of the new area). Likewise, if a service is updated with a new feature, the model is updated to reflect the actions that the new feature can perform. This may include new APIs or changes to existing APIs. The updated model 212 provides the types (e.g., service, area, etc.) and the terms (e.g., service name, area name, intent, etc.) of the domain specific language 208.

Additionally, when a new provider network event is detected, an update manager 206 can be triggered. The update manager 206 can cause the intent statements to be recompiled by compiler 202. The intent statements are compiled in view of the updated provider network model 212 which provides updated policies that reflect the changes to the provider network 100. This automatically keeps a user's policies up to date with the current state of provider network 100, ensuring their intent is being effected across new services and/or features as they are implemented, rather than requiring the user to stay up to date on the current state of provider network 100 or requiring the user to be reactive to actions that violate their intent after they have occurred.

Figure 3:
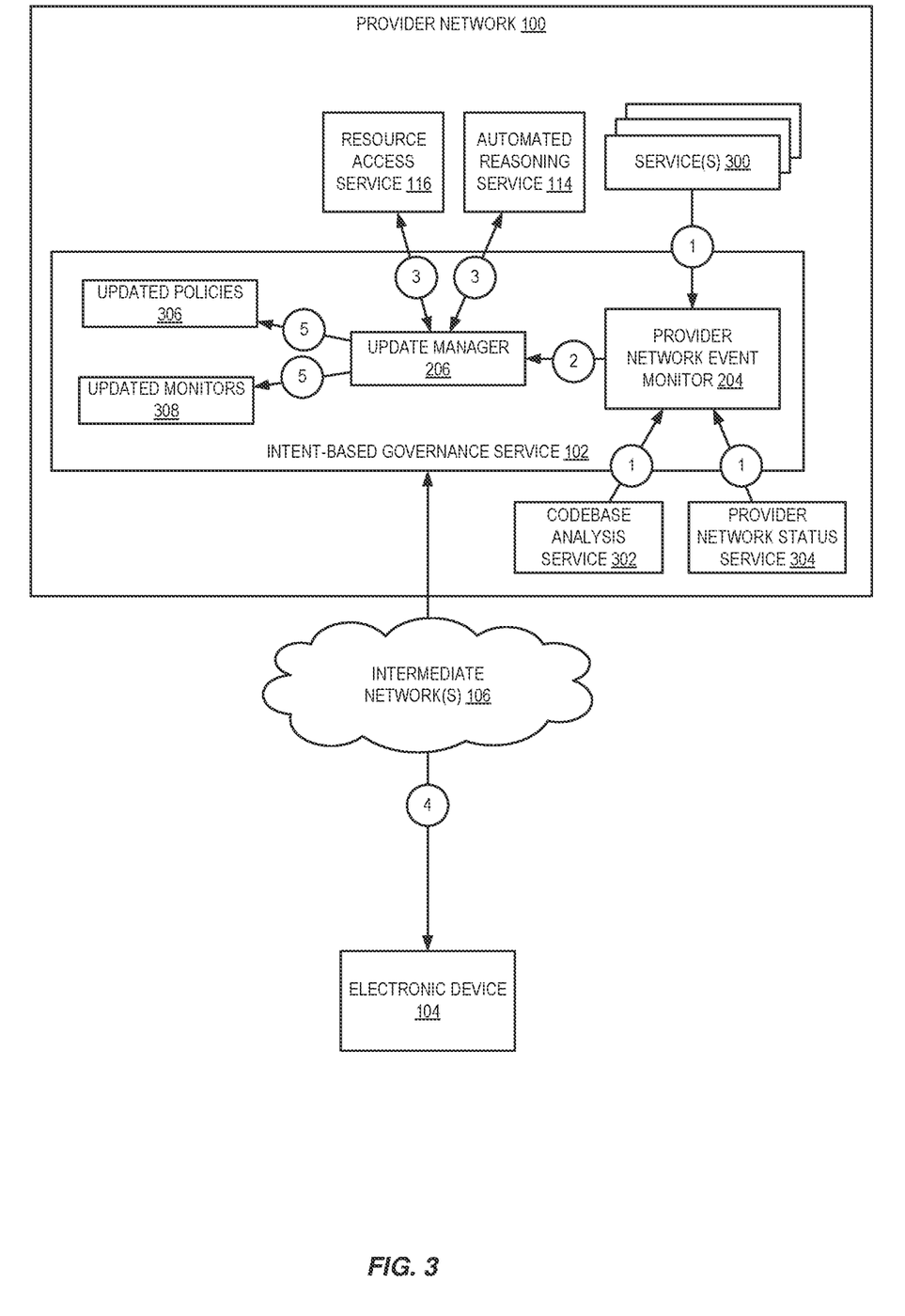
FIG. 3 is a diagram illustrating an environment for automatically generating updated policies by an intent-based access control based on service changes according to some embodiments.

FIG. 3 is a diagram illustrating an environment for automatically generating updated policies by an intent-based access control based on service changes according to some embodiments. As discussed, intent-based governance service 102 can include one or more provider network event monitors 204. These monitors 204 can receive event data from one or more services 300 of provider network 100, at numeral 1. In some embodiments, provider network event monitor 204 can receive events from a codebase analysis service 302 which performs static code analysis on services of the provider network 100. This enables new features of these services to be identified before they go live. The provider network model 212 can then be updated automatically once the new features go live. In some embodiments, provider network event monitor 204 can receive events from provider network status services 304, such as an area status service which tracks the status of areas of the provider network (e.g., when a new area added to production and made available to customers of the provider network, or when an existing area is removed from production, merged with another existing or new area, etc.), an SDK status service which tracks the status of new SDKs (e.g., as they are made available to customers, removed from production, updated, etc.) or other provider network status information. Based on the status of each area, the provider network model 212 can be updated.

For example, if provider network status services 304 indicates that a new area of provider network 100 has been brought online in Europe, then governance policies may need to be updated to reflect this change in provider network status. For example, some customers may intend for none of their resources to be hosted in any area located in Europe, while other customers may intend for all or some of their resources to be hosted in any area located in Europe. Prior solutions would have required the customer to specifically enumerate the areas in a policy, which requires the customer to both know which areas are located in a specific geographic region and stay up to date as to any areas that have been added to, or removed from, that region, to ensure their resources are being hosted where they intend. For example, a customer's resources may be added to a new area in Europe because they did not specify to exclude that area when they wrote their policy (e.g., because the area did not exist when they wrote their policy). However, in various embodiments, the provider network model 212 is updated based on events, such as an event generated when a new area is added. As such, if a new area has been added to Europe, and the customer has an intent-based governance policy to exclude European area from hosting their resources, then upon recompilation of the intent-based governance policy, the new area will also automatically be excluded, without the customer knowing that the new area exists.

Once the provider network model 212 has been updated based on the events received from services 300, codebase analysis service 302, area status service 304, etc., the provider network event monitor 204 can invoke the update manager 206 to generate updated policies and/or monitors at numeral 2. As discussed, the update manager 206 can cause the intent statements to be recompiled by compiler 202. The intent statements are compiled in view of the updated provider network model 212 which provides updated policies that reflect the changes to the provider network 100. This automatically keeps a user's policies up to date with the current state of provider network 100. In some embodiments, the update manager 206 can also request that the updated policies be analyzed by automated reasoning service 114 and/or resource access service 116, at numeral 3, to identify any conflicts between the new policies and existing policies. At numeral 4, feedback can be provided to the user. For example, if any conflicts are identified by the resource access service 116 or the automated reasoning service 114, then the user can be alerted to the conflicts and they can update their intent statements to account for the conflicts. Additionally, or alternatively, an informational update can be provided to the user indicating the policy changes that have been implemented and the provider network changes that prompted them. At numeral 5, the updated policies 306 and/or updated monitors 308 can be associated with the appropriate principals.

Figure 4:
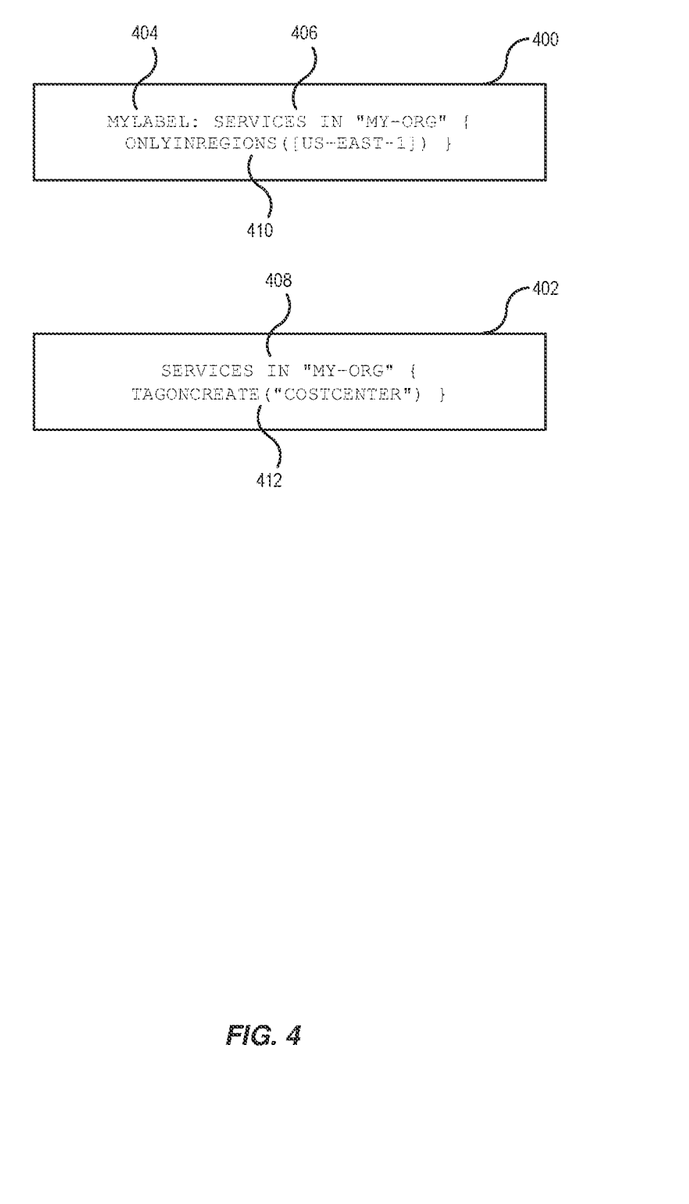
FIG. 4 is a diagram illustrating examples of intent expressions using a domain specific language according to some embodiments.

FIG. 4 is a diagram illustrating examples of intent expressions using a domain specific language according to some embodiments. As discussed, embodiments define intents using a domain specific language (e.g., a computer language that is specialized in a particular domain). This domain, in various embodiments, is governance intent. As shown in FIG. 4, example intent statements 400 and 402 in the domain specific language can include an optional label 404, a selector 406 and 408, and an intent 410 and 412. For example, intent statement 400 and intent statement 402 each represent an invariant. A single policy may include any number of invariants. Each intent statement can include a selector and one or more intents. The selector 406, 408 in both examples is 'services in "my-org"'. In terms of logic, the selector represents the left side of an implication (e.g., for all things selector(thing)=>intents(thing). As such, in the intent statement 400, a policy is created such that the services in the organization "my-org" are only accessible in the areas denoted in ONLYINREGIONS([list of areas]). In this example, the services are only accessible in an area called US-EAST-1. Similarly, an intent statement could be structured such that services were only accessible in European Areas. As a result, if a new area is added to Europe, the policies would be automatically updated to allow for the services to be accessed from the new region. In intent statement 402, a tagging policy is created which tags all resources that are created for the services in "my-org" are tagged based on their associated "costcenter".

When an intent statement is received, it can be parsed. In some embodiments, the grammar of the intent statements is specified as an ANTLR grammar, however alternative grammars may also be implemented. The parsed grammar is lowered to an abstract syntax tree where names have been resolved. In some embodiments, a typechecker can then identify types associated with the intent statement, as shown below:

Services in "my-org" {OnlyInRegions([us-east-1])}::Invariant
Services in "my-org"::Selector<Service>
Services::Selector<Service>
OnlyInRegions([us-east-1])::Fact<Service>
OnlyInRegions::(List<Region>)->Fact<Service>
[us-east-1]::List<Region>
us-east-1::Region Once parsed, the intent statement can be compiled into a policy. As discussed, a compiler is responsible for formatting the policy correctly and for determining the attachment point for the policy.

Figure 5:
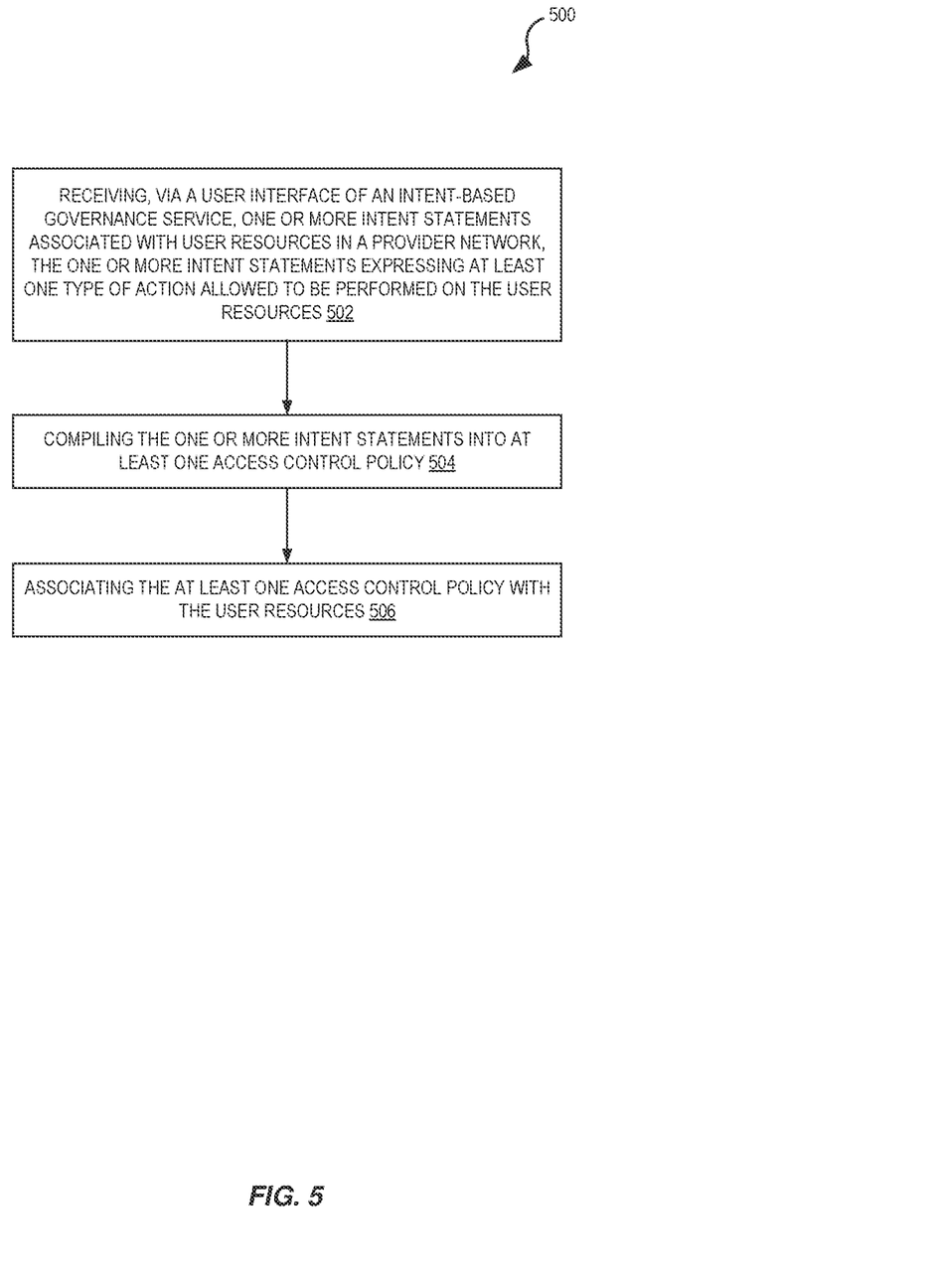
FIG. 5 is a flow diagram illustrating operations of a method for intent-based access control according to some embodiments.

FIG. 5 is a flow diagram illustrating operations 500 of a method for intent-based access control according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by intent-based governance service 102 of the other figures.

The operations 500 include, at block 502, receiving, via a user interface of an intent-based governance service, one or more intent statements associated with user resources in a provider network, the one or more intent statements expressing at least one type of action allowed to be performed on the user resources. In some embodiments, the intent statements are written in a domain specific language.

The operations 500 further include, at block 504, compiling the one or more intent statements into at least one access control policy. In some embodiments, prior to compiling the one or more intent statements, the intent statements are parsed, and type checked to identify the intent of the statements and the resources to which the intent is to be applied.

The operations 500 further include, at block 506, associating the at least one access control policy with the user resources. In some embodiments, the compiler can identify the resources or principals to whom the at least one access control policy is to be applied and attach the resulting at least one access control policy to the resources or principals automatically.

In some embodiments, the operations further include sending a request to a resource activity service to compare the at least one access control policy to an activity history associated with the user resources, and receiving a response indicating that the at least one access control policy would restrict recent activity associated with the user resources. For example, the resource activity service can maintain an access history of the user's resources. If the new policies conflict with existing access patterns (e.g., would restrict accesses that have recently occurred), then the access patterns can be presented to the user to decide how to resolve the conflicts. For example, the existing access patterns can be preserved but not further accesses will be allowed going forward, all accesses are restricted according to the new policy, etc. For example, in some embodiments, the operations further include returning, via the user interface of the intent-based governance service, a message indicating the recent activity that would be restricted by the at least one access control policy, receiving at least one updated intent statement, and compiling the at least one updated intent statement into at least one updated access control policy. The updated access control policy can take into account the changes to intent made by the user in the updated intent statement.

In some embodiments, the operations further include receiving an event from a service of the provider network indicating at least one change to the provider network. As discussed, the intent-based governance service can keep policies up to date as changes are made to services of the provider network or the provider network itself. As such, such changes can be monitored by the intent-based governance service. In some embodiments, the operations further include updating a model of the provider network based on the at least one change. In some embodiments, the operations further include recompiling the one or more intent statements using the updated model to generate at least one updated access control policy which applies to the at least one change to the provider network. In some embodiments, the service of the provider network is a static code analysis service, and wherein the at least one change is a new feature of a second service of the provider network identified based on a static code analysis. In some embodiments, the service of the provider network is an area status service, and wherein the at least one change is a new area of the provider network being brought online.

In some embodiments, the operations include receiving, via a user interface of an intent-based governance service of a provider network, one or more intent statements written in a domain specific language from a customer expressing security intent for customer resources, parsing the one or more intent statements based on a provider network model, compiling the parsed one or more intent statements into at least one access control policy, associating the at least one access control policy with the customer resources based on the one or more intent statements, detecting a change to the provider network based on a static code analysis of one or more services of the provider network, updating the provider network model based on the change to the provider network, and recompiling the parsed one or more intent statements into an updated at least one access control policy, the updated at least one access control policy applying to at least the one or more services of the provider network that have changed.

In some embodiments, the security intent includes limiting access to the customer resources from one or more regions of the provider network. In some embodiments, the security intent includes limiting sharing of the customer resources to the customer's organization.

Figure 6:
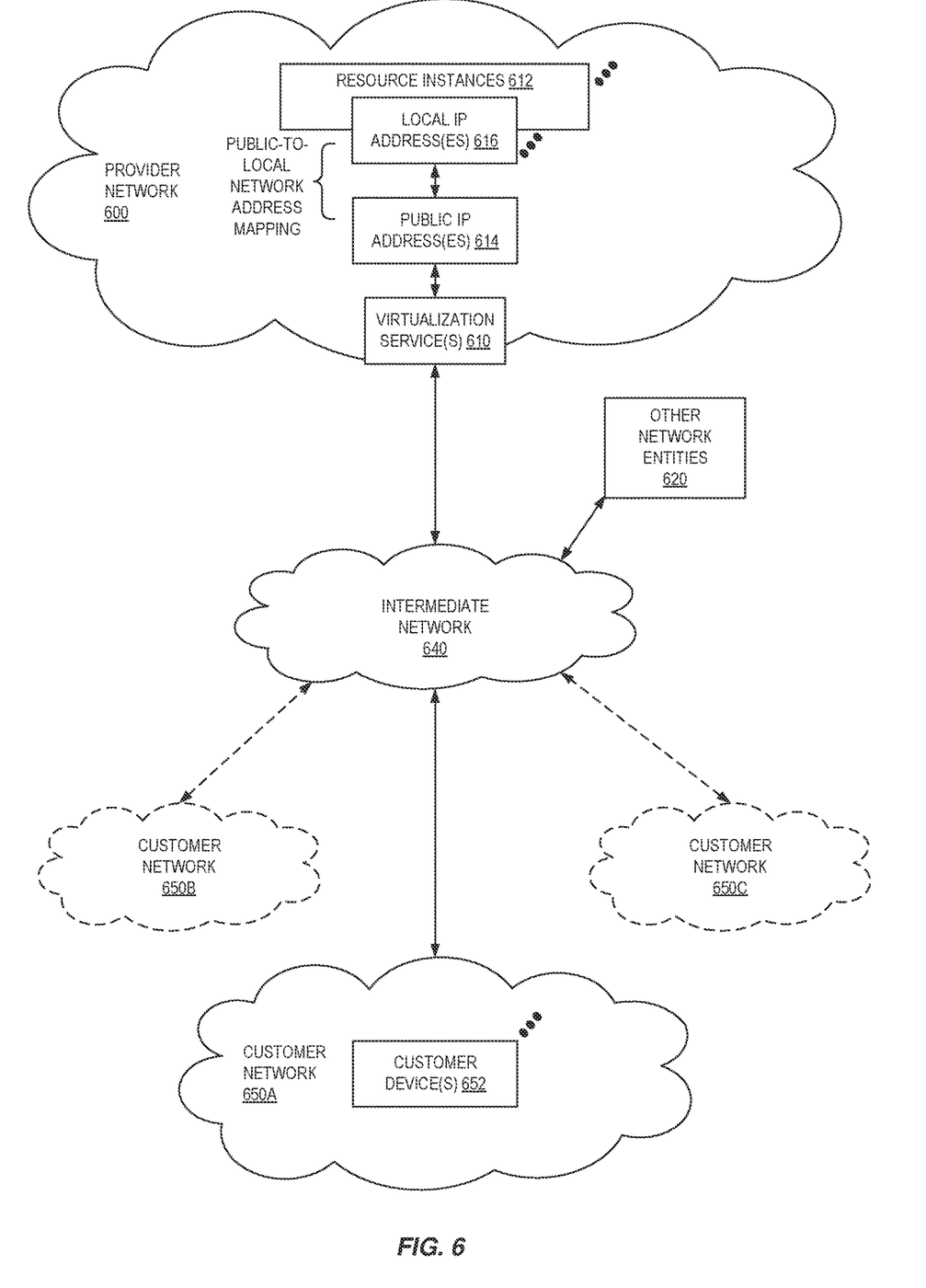
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
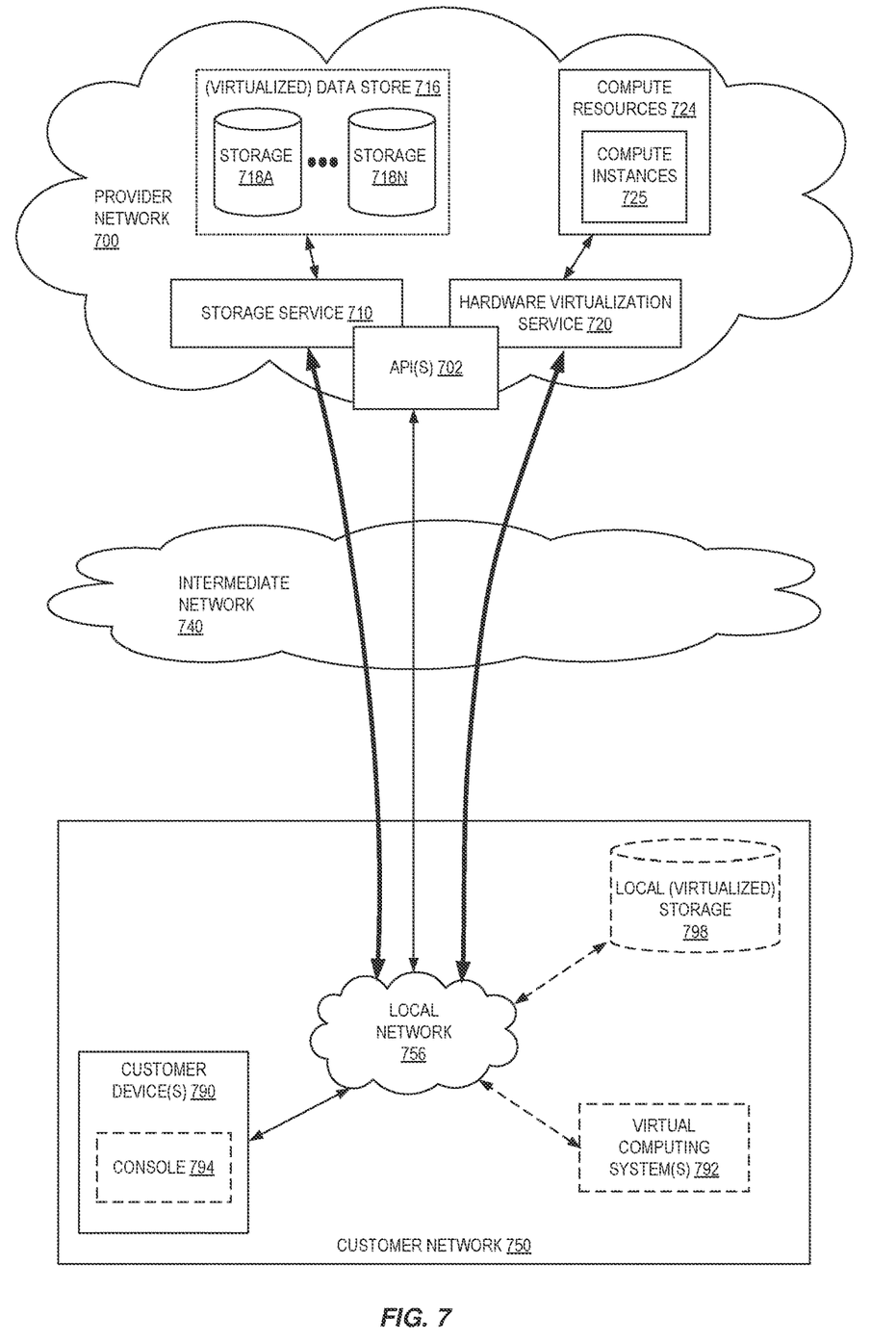
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
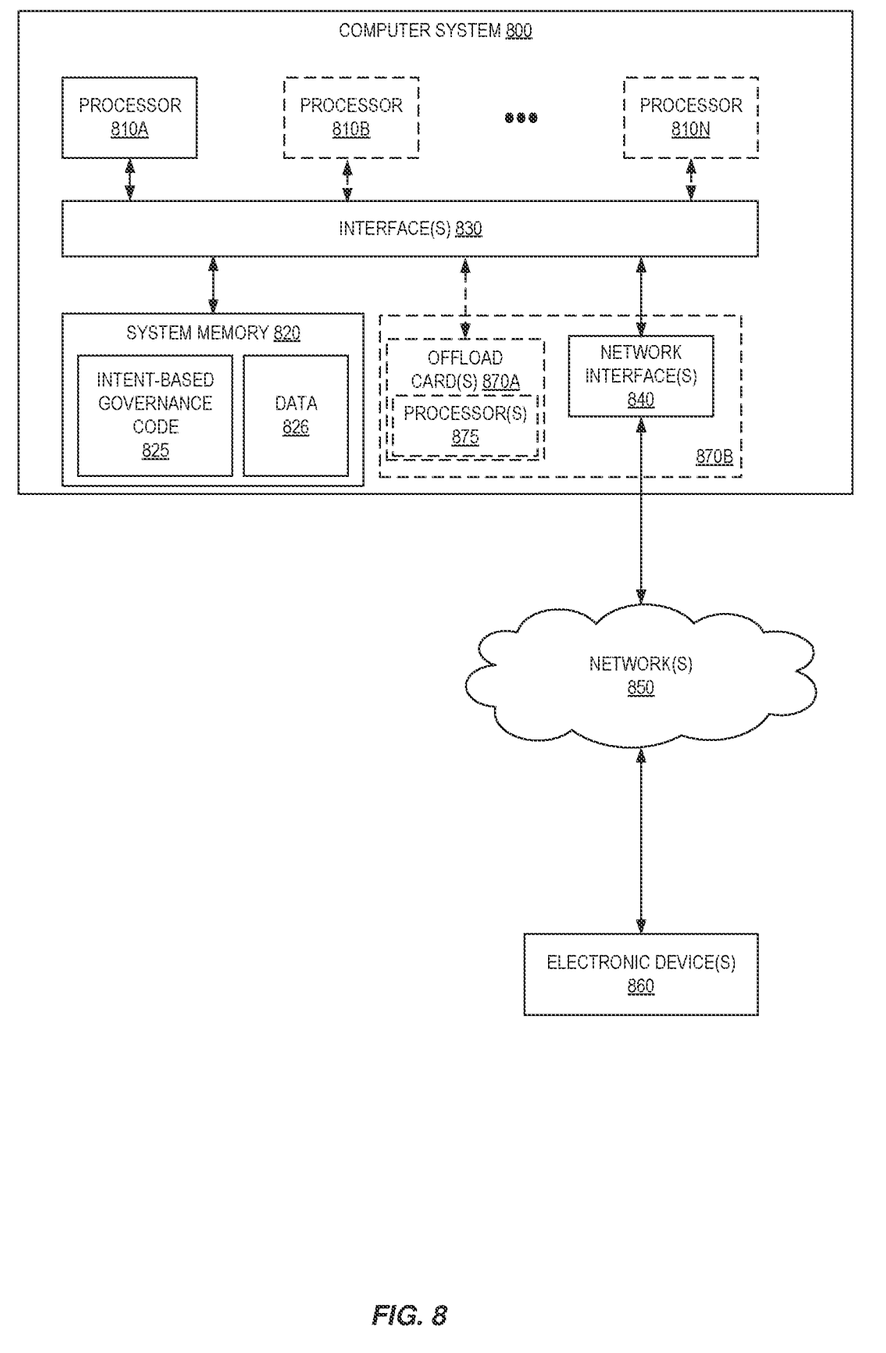
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as intent-based governance service code 825 (e.g., executable to implement, in whole or in part, the intent-based governance service 102) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at an intent-based governance service in a provider network, via a user interface of the intent-based governance service of the provider network, one or more intent statements written in a domain-specific language from a customer expressing security intent for customer computing resources hosted by the provider network;
   parsing the one or more intent statements based on a provider network model to generate parsed one or more intent statements;
   compiling the parsed one or more intent statements into at least one access control policy;
   associating the at least one access control policy with the customer computing resources based on the parsed one or more intent statements;
   detecting a change to the provider network based on a static code analysis of one or more services of the provider network;
   updating the provider network model based on the change to the provider network; and
   recompiling, by an update manager of the intent-based governance service, the parsed one or more intent statements into an updated at least one access control policy, the updated at least one access control policy applying to at least the one or more services of the provider network that have changed.

2. The computer-implemented method of claim 1, wherein the security intent for customer computing resources includes limiting access to the customer computing resources from one or more regions of the provider network.

3. The computer-implemented method of claim 1, wherein the security intent for customer computing resources includes limiting sharing of the customer computing resources to the customer's organization.

4. A computer-implemented method comprising:
   receiving, at an intent-based governance service in a provider network, via a user interface of the intent-based governance service, one or more intent statements written in a domain-specific language from a user and associated with user computing resources hosted by the provider network, the one or more intent statements expressing at least one type of action allowed to be performed on the user computing resources;
   parsing the one or more intent statements based on a provider network model to generate parsed one or more intent statements;
   compiling the parsed one or more intent statements into at least one access control policy;
   associating the at least one access control policy with the user computing resources based on the parsed one or more intent statements;
   receiving, at a network event monitor of the intent-based governance service from a service of the provider network, event data indicating at least one change to the provider network, the at least one change to the provider network detected based on a static code analysis of one or more services of the provider network;
   updating the provider network model based on the at least one change to the provider network to thereby generate an updated model; and
   recompiling, by an update manager of the intent-based governance service, the parsed one or more intent statements using the updated model to thereby generate at least one updated access control policy that applies to the at least one change to the provider network.

5. The computer-implemented method of claim 4, further comprising:
sending a request to at least one of an automated reasoning service or a resource access service to determine whether there are any conflicts with the at least one access control policy and one or more existing permissions or access patterns;
based on one or more responses from the at least one of the automated reasoning service or the resource access service, returning feedback for the parsed one or more intent statements via the user interface; and
receiving, via the user interface, a confirmation of the parsed one or more intent statements.

6. The computer-implemented method of claim 5, wherein determining whether there are any conflicts with the at least one access control policy and one or more existing permissions or access patterns comprises:
translating, by the automated reasoning service, the at least one access control policy into at least one mathematical representation; and
using, by the automated reasoning service, automated reasoning tools to analyze the at least one mathematical representation of the at least one access control policy to determine whether any conflicts occur.

7. The computer-implemented method of claim 4, further comprising:
sending a request to a resource activity service to compare the at least one access control policy to an activity history associated with the user computing resources; and
receiving a response indicating that the at least one access control policy would restrict recent activity associated with the user computing resources.

8. The computer-implemented method of claim 7, further comprising:
returning, via the user interface of the intent-based governance service, a message indicating the recent activity that would be restricted by the at least one access control policy;
receiving at least one updated intent statement; and
compiling the at least one updated intent statement into at least one updated access control policy.

9. The computer-implemented method of claim 8, wherein the at least one type of action allowed to be performed on the user computing resources relates to limiting access to the user computing resources from one or more regions of the provider network.

10. The computer-implemented method of claim 4, wherein the at least one type of action allowed to be performed on the user computing resources relates to sharing of the user computing resources to the customer's organization.

11. The computer-implemented method of claim 4, wherein the service of the provider network is a static code analysis service, and wherein the at least one change is a new feature of a second service of the provider network identified based on a static code analysis.

12. The computer-implemented method of claim 4, wherein the service of the provider network is an area status service, and wherein the at least one change is a new area of the provider network being brought online.

13. A system comprising:
a first one or more electronic devices hosting user computing resources in a multi-tenant provider network, the user computing resources including one or more first processors and first memory; and
a second one or more electronic devices implementing an intent-based governance service in the multi-tenant provider network, the intent-based governance service including one or more second processors and second memory storing instructions that upon execution by the one or more second processors cause the intent-based governance service to:
receive, via a user interface of the intent-based governance service, one or more intent statements written in a domain-specific language from a user and associated with the user computing resources hosted by the provider network, the one or more intent statements expressing at least one type of action allowed to be performed on the user computing resources;
parse the one or more intent statements based on a provider network model to generate parsed one or more intent statements;
compile the parsed one or more intent statements into at least one access control policy;
associate the at least one access control policy with the user computing resources based on the parsed one or more intent statements;
receive, at a network event monitor of the intent-based governance service from a service of the provider network, event data indicating at least one change to the provider network, the at least one change to the provider network detected based on a static code analysis of one or more services of the provider network;
update the provider network model based on the at least one change to the provider network to thereby generate an updated model; and
recompile, by an update manager of the intent-based governance service, the parsed one or more intent statements using the updated model to thereby generate at least one updated access control policy that applies to the at least one change to the provider network.

14. The system of claim 13, wherein the instructions, when executed, further cause the intent-based governance service to:
send a request to a resource activity service to compare the at least one access control policy to an activity history associated with the user computing resources; and
receive a response indicating that the at least one access control policy would restrict recent activity associated with the user computing resources.

15. The system of claim 14, wherein the instructions, when executed, further cause the intent-based governance service to:
return, via the user interface of the intent-based governance service, a message indicating the recent activity that would be restricted by the at least one access control policy;
receive at least one updated intent statement; and
compile the at least one updated intent statement into at least one updated access control policy.

16. The system of claim 13, wherein the instructions, when executed, further cause the intent-based governance service to:
send a request to at least one of an automated reasoning service or a resource access service to determine whether there are any conflicts with the at least one access control policy and one or more existing permissions or access patterns;

based on one or more responses from the at least one of the automated reasoning service or the resource access service, return feedback for the parsed one or more intent statements via the user interface; and receive, via the user interface, a confirmation of the parsed one or more intent statements.

17. The system of claim 13, wherein the at least one type of action allowed to be performed on the user computing resources relates to limiting access to the user computing resources from one or more regions of the provider network.

18. The system of claim 17, wherein the at least one type of action allowed to be performed on the user computing resources relates to sharing of the user computing resources to the customer's organization.

19. The system of claim 13, wherein the instructions, when executed, further cause the intent-based governance service to receive an event from a service of the provider network indicating at least one change to the provider network, and wherein the service of the provider network is a static code analysis service, and wherein the at least one change is a new feature of a second service of the provider network identified based on a static code analysis.

20. The system of claim 13, wherein the instructions, when executed, further cause the intent-based governance service to receive an event from a service of the provider network indicating at least one change to the provider network, and wherein the service of the provider network is an area status service, and wherein the at least one change is a new area of the provider network being brought online.

* * * * *